Figure 1:
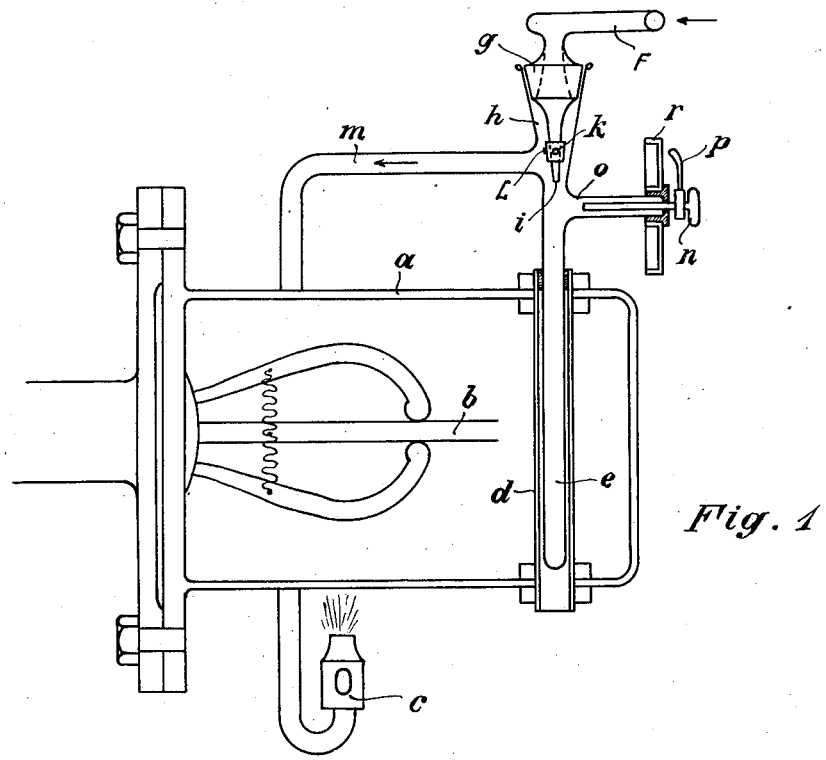

Aug. 16, 1927.  E. WIELAND  1,639,475

PROCESS FOR THE PRODUCTION OF ARTICLES AND COVERS FROM RESINOUS COMPOSITIONS

Filed Sept. 18, 1924

Inventor
E. Wieland
by Marks & Clerk
Attys.

Patented Aug. 16, 1927.

1,639,475

UNITED STATES PATENT OFFICE.

EBERHARD WIELAND, OF PFORZHEIM, GERMANY.

PROCESS FOR THE PRODUCTION OF ARTICLES AND COVERS FROM RESINOUS COMPOSITIONS.

Application filed September 18, 1924, Serial No. 738,523, and in Germany July 23, 1924.

The object of the invention is a process for producing covers from resinlike or artificial resinlike compositions. It is already known how to harden such powdery or liquid compositions by heating at higher temperatures.

It has now been found that this treatment at higher temperatures, will cause these substances to harden more quickly and to yield better and denser products if it is effected with the application of pressure, e. g. in a closed tight vessel.

The process described can also be considerably improved by hardening the compositions under pressure, not by heating them quickly at the hardening temperature, but by raising the temperature slowly and gradually and by maintaining the highest temperature of about 80° C. for a long time. Good results will especially be achieved by this process with the application of liquid artificial resinlike compositions which are subjected, before the hardening treatment properly speaking, to a preliminary condensation, preferably in avoiding noxious temperatures, e. g. by condensing on the water-bath at about 70° C.

An inconvenience of the hardening process hitherto known, consisting in raising the temperature quickly at the highest hardening temperature, was that the edges of the objects or covers to be made would easily flow away.

This disadvantage will completely be avoided by the new process. It has been ascertained that a complete hardening may be achieved also with greater thickness of material, if the gradual increase of the temperature is effected so slowly as to avoid permanently a transformation of the compositions into a thin-liquid state.

An essential advantage of the new process is that it will not only prevent the edges from flowing away, but also obtain a high translucence of the objects produced. Moreover the new process will allow a very thorough and uniform hardening of the composition in its total thickness. On the contrary, when hardening with high starting temperature the core will easily remain soft under a hard layer which is impermeable for the reaction products created by the hardening. A further advantage of the new process is that the colours of the objects and covers made by it will entirely resist any influence, a result which could never be guaranteed with the process hitherto in use.

The compositions made following the new process may be used for articles and covers of every kind, the firmness, heating, persistency and resistance of which, in the presence of any chemical agents, are liable to high requirements. They are especially suitable for instance for the manufacture of dental prostheses as tooth-plates etc.

In executing the new process it may preferably be preceded by a preliminary condensation of the liquid composition, after adding a liquid raising the hardening speed and the plasticity.

This condensation should be preferably effected on the water-bath, at a temperature of the composition of 70°, until it will just flow off slowly in thick strings when being drawn out with the spattle. Only in this way the most favourable plasticity required by the following treatment can be obtained.

In this state the composition is moulded on the object to be covered, e. g. a set of teeth, which should be heated in advance at a temperature of from 50° to 70°. Thereupon the composition is hardened in the pressure-boiler, in the course of which operation the heat must be raised to 55° during one hour at least. A slower increase is of no consequence, whereas too rapid heating might easily cause the edges to melt.

During the following hour the temperature is raised to 60°, as limited, with regard to the dissolubility of the composition, by the preliminary condensation at 70°. At this temperature the apparatus is kept for about two hours, whereupon the hardening is completed at 80° in one hour. The objects thus obtained will still entirely show the edges modeled, a pleasing lustre, high elasticity and adhesiveness; besides they will have a thoroughly equal extremely great hardness.

For controlling the slow increase of the temperature, as essentially required for the process in question, one may preferably use a densely closed vessel with strong sides, in which a thermostat is placed, according to the invention, as shown e. g. on the subjoined drawing.

Figure 2:
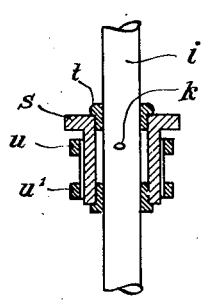

Fig. 1 shows the pressure-vessel with the thermostat in the elevation-section,

Fig. 2 the regulating nozzle in the elevation-section on a larger scale, and

Figure 3:
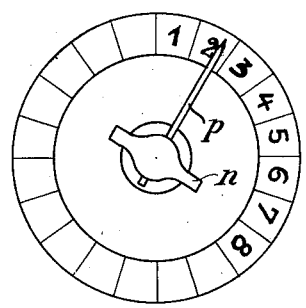

Fig. 3 the regulating screw of the thermostat.

On this drawing $a$ denotes the sides of the pressure-vessel, $b$ the device inside for holding the objects to be hardened, $c$ the apparatus for heating, e. g. a Bunsen-burner.

The heating of the pressure-vessel can, of course be effected with insertion of an oil or water-bath. The pressure-boiler contains a tube $d$, in the interior of which the tube $e$ of a mercury-thermostat is placed, the latter e. g. of the usual type. The letter $f$ refers to a pipe conveying gas, $g$ to a cone of the gas-supply; this cone is cut in the duly enlarged conic part $h$ of the mercury-tube; $i$ denotes the continuation of the gas-supply, i. e. the gas-nozzle open below and provided, at $k$, with an auxiliary opening, the latter with the regulating contrivance $l$. Through the conduit $m$ the gas is carried on to the Bunsen-burner $c$. The letter $n$ denotes a regulating screw affixed on the side-branch $o$ of the tube $e$; this screw is supplied with a pointer $p$ movable on the scale $r$.

On Figure 2 $i$ marks again the main gas-nozzle, $k$ the auxiliary opening, whereas $s$ represents a metal-sleeve, placed e. g. by means of washers $t$ on the tube $i$, the nuts $u$ and $u^1$ being fixed on this sleeve. By regulating the nut $u$ and the sleeves the gas exit $k$ can be regulated.

On Figure 3 are to be seen the regulating cock $n$ of the thermostat with pointer $p$ and scale $r$.

When making covers from resinlike compositions, as required e. g. for dental prostheses, plates of teeth etc., the device may be used e. g. as follows:

The air-supply of the Bunsen-burner is regulated in such a way that, with a very small flame, a turning will no more be possible. By turning the cock $n$, the level of the mercury is then raised, so that it will close the lower opening of the gas-pipe $i$, while the closure $l$ of the auxiliary opening $k$ (Fig. 2) is regulated in such a manner that the increase of the temperature of the composition from ordinary temperature (20° e. g.), to 55° will last one hour at least.

The regulating of the nozzle $k$ may be operated by turning the nut $u$, its distance from the band of the sleeve $s$ being thus changed. The nut $u^1$ serves to secure the upper nut $r$ and to press it against its worm.

After adjustment of the auxiliary nozzle the level of the mercury is lowered, by turning the top $n$, so much that the main opening of the flame is opened so far as to allow the temperature in the apparatus to remain constant at 60°. The position in question is marked on the scale-dial $r$, or the latter is turned so far that its zero will coincide with the pointer $p$. Accordingly the position of the pointer on the scale may be marked for the stand of the mercury-level corresponding to a temperature of 70° or 80° respectively.

After having regulated the apparatus in this manner, it may be served, when hardening the composition, almost in an automatical way for a long time, the main opening of the tube $i$ remaining at first closed for one hour at least, so that only the regulated auxiliary flame is burning. Thereupon the main opening is left free, the pointer being set on zero for one hour (corresponding to 60°), whereas, during the further treatment, the pointer must show a position corresponding to 70° or 80° respectively.

The device described may also be used with advantage for many other thermal or chemical processes, for which a treatment under pressure and with precise regulation of the temperature, e. g. a gradual one, is required.

Claims:

1. In the heat and pressure process of molding and hardening resinous plastics, the process which comprises subjecting a viscid resin, while under continued pressure, to a slow and gradual increase in temperature.

2. In the heat and pressure process of molding and hardening resinous plastics, the process which comprises subjecting a viscid resin, while under continued pressure, to a slow and gradual increase in temperature over a prolonged period of time.

3. In the heat and pressure process of molding and hardening resinous plastics, the process which comprises subjecting a viscid resin, while under continued pressure, to a slow and gradual increase in temperature, the final temperature being not substantially above 80° C.

4. In the heat and pressure process of molding and hardening resinous plastics, the process which comprises subjecting a viscid resin, while under continued pressure, to a slow and gradual increase in temperature, the final temperature being not substantially above 80° C., and maintaining this temperature for a prolonged period of time until hardening is complete.

5. In the heat and pressure process of molding and hardening resinous plastics, the process which comprises subjecting the reactive resinous material to a preliminary condensation to convert the material into a viscid mass and thereafter subjecting the mass while under continued pressure to a gradual increase in temperature.

6. In the heat and pressure process of molding and hardening resinous plastics, the process which comprises subjecting the reactive resinous material to a preliminary condensation under controlled temperature to prevent overheating, continuing the condensation until the material becomes viscid and thereafter subjecting the mass while under continued pressure to a gradual increase in temperature.

7. In the heat and pressure process of molding and hardening resinous plastics, the process which comprises subjecting the reactive resinous material to a preliminary condensation to convert the material into a viscid mass and thereafter subjecting the mass while under continued pressure to a gradual increase in temperature over a prolonged period of time.

8. In the heat and pressure process of molding and hardening resinous plastics, the process which comprises subjecting the reactive resinous material to a preliminary condensation to convert the material into a viscid mass and thereafter subjecting the mass while under continued pressure to a gradual increase in temperature, the final temperature being not substantially above 80° C.

9. In the heat and pressure process of molding and hardening resinous plastics, the process which comprises subjecting the reactive resinous material to a preliminary condensation to convert the material into a viscid mass, thereafter subjecting the mass while under continued pressure to a gradual increase in temperature and maintaining this temperature for a prolonged period of time until hardening is complete.

10. The process as in claim 5 in which the preliminary condensation is carried out at a temperature of about 70° C.

11. The process as in claim 6 in which the preliminary condensation is carried out at a temperature of about 70° C.

In testimony whereof I affix my signature.

EBERHARD WIELAND.